US008599926B2

(12) United States Patent
Karczewicz

(10) Patent No.: US 8,599,926 B2
(45) Date of Patent: Dec. 3, 2013

(54) COMBINED RUN-LENGTH CODING OF REFINEMENT AND SIGNIFICANT COEFFICIENTS IN SCALABLE VIDEO CODING ENHANCEMENT LAYERS

(75) Inventor: Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1506 days.

(21) Appl. No.: 11/867,985

(22) Filed: Oct. 5, 2007

(65) Prior Publication Data

US 2008/0089422 A1    Apr. 17, 2008

Related U.S. Application Data

(60) Provisional application No. 60/883,739, filed on Jan. 5, 2007, provisional application No. 60/829,276, filed on Oct. 12, 2006, provisional application No. 60/893,586, filed on Mar. 7, 2007.

(51) Int. Cl.
*H04N 11/02* (2006.01)

(52) U.S. Cl.
USPC ............... 375/240.23; 375/240.22; 341/56; 341/65; 341/67

(58) Field of Classification Search
USPC ............... 375/240.2, 240.24, 240.22, 240.23; 341/56, 65, 67
See application file for complete search history.

(56) References Cited

U.S. PATENT DOCUMENTS

| | | |
|---|---|---|
| 5,400,075 A | 3/1995 | Savatier |
| 5,640,420 A | 6/1997 | Jung |
| 5,650,782 A | 7/1997 | Kim |
| 5,793,897 A | 8/1998 | Jo et al. |
| 5,835,145 A | 11/1998 | Ouyang et al. |
| 5,982,437 A | 11/1999 | Okazaki et al. |
| 6,069,575 A | 5/2000 | Kinouchi et al. |

(Continued)

FOREIGN PATENT DOCUMENTS

| | | |
|---|---|---|
| JP | 6225279 A | 8/1994 |
| JP | 7274171 A | 10/1995 |

(Continued)

OTHER PUBLICATIONS

ITU-T Recommendation H.223, Multiplexing Protocol for Low Bit Rate Multimedia Communication, (Jul. 2001), pp. 1-74.
ITU-T Recommendation H.263 Video Coding for Low Bit Rate Communication (Jan. 2005), pp. 1-226.
ITU-T Recommendation H.264, Advanced Video Coding for Generic Audiovisual Services, Mar. 2005, pp. 1-343.

(Continued)

*Primary Examiner* — Kibrom T Hailu
*Assistant Examiner* — Benjamin Lamont
(74) *Attorney, Agent, or Firm* — Brent Boyd

(57) ABSTRACT

This disclosure describes techniques for coding an enhancement layer in a scalable video coding (SVC) scheme. The techniques involve run-length coding of significant coefficients and refinement coefficients of the enhancement layer. Rather than performing two different run-length passes to separately code the significant coefficients and refinement coefficients, the techniques of this disclosure perform run-length coding of the significant coefficients and refinement coefficients together. Therefore, run values of the run-length coding codes the significant coefficients with the refinement coefficients. Additional techniques are also described, which can eliminate the need to send sign information for some of the refinement coefficients. Instead, this sign information for some of the refinement coefficients may be derived at the decoder based on the sign values of corresponding coefficients of previously encoded layers of the SVC scheme, which can further improve compression efficiency.

25 Claims, 9 Drawing Sheets

(56) References Cited

U.S. PATENT DOCUMENTS

| | | | |
|---|---|---|---|
| 6,144,322 | A | 11/2000 | Sato |
| 6,275,531 | B1 * | 8/2001 | Li .................... 375/240.12 |
| 6,690,307 | B2 | 2/2004 | Karczewicz |
| 6,700,933 | B1 | 3/2004 | Wu et al. |
| 6,919,828 | B2 | 7/2005 | Jeon et al. |
| 6,980,597 | B1 | 12/2005 | Ling |
| 7,348,903 | B2 | 3/2008 | Lee et al. |
| 7,369,706 | B2 | 5/2008 | Kurauchi |
| 7,664,176 | B2 | 2/2010 | Bao et al. |
| 7,912,510 | B2 | 3/2011 | Park et al. |
| 2001/0033697 | A1 | 10/2001 | Shimada |
| 2003/0009722 | A1 | 1/2003 | Sugiyama et al. |
| 2003/0151529 | A1 | 8/2003 | Karczewicz |
| 2004/0005096 | A1 | 1/2004 | Kim et al. |
| 2004/0179606 | A1 | 9/2004 | Zhou et al. |
| 2005/0025246 | A1 | 2/2005 | Holcomb |
| 2006/0078049 | A1 | 4/2006 | Bao et al. |
| 2006/0153294 | A1 | 7/2006 | Wang et al. |
| 2006/0233255 | A1 | 10/2006 | Ridge et al. |
| 2006/0273939 | A1 | 12/2006 | Tanaka et al. |
| 2007/0080832 | A1 * | 4/2007 | Yang et al. .................... 341/50 |
| 2007/0160126 | A1 | 7/2007 | Van Der Meer et al. |
| 2007/0224973 | A1 | 9/2007 | Park et al. |
| 2008/0089420 | A1 | 4/2008 | Karczewicz |
| 2008/0089423 | A1 | 4/2008 | Karczewicz |
| 2008/0089424 | A1 | 4/2008 | Karczewicz et al. |
| 2009/0129467 | A1 | 5/2009 | Li et al. |

FOREIGN PATENT DOCUMENTS

| | | |
|---|---|---|
| JP | 8046521 A | 2/1996 |
| JP | 08280032 | 10/1996 |
| JP | 11242573 A | 9/1999 |
| JP | 11252573 A | 9/1999 |
| JP | 2001094982 | 4/2001 |
| JP | 2002058028 A | 2/2002 |
| JP | 2008507191 A | 3/2008 |
| JP | 2009506710 A | 2/2009 |
| KR | 20010105629 | 11/2001 |
| KR | 20030081772 | 10/2003 |
| KR | 100606588 | 8/2006 |
| KR | 20070062393 A | 6/2007 |
| KR | 1032277 | 4/2011 |
| RU | 2117388 | 8/1998 |
| RU | 2119727 | 9/1998 |
| RU | 2004125588 | 1/2006 |
| RU | 2005113308 | 1/2006 |
| RU | 2335845 | 10/2008 |
| TW | 200612755 | 4/2006 |
| TW | 200627963 | 8/2006 |
| WO | 9517073 A1 | 6/1995 |
| WO | WO03053066 A1 | 6/2003 |
| WO | WO2005009408 1 | 10/2005 |
| WO | WO2006067712 A1 | 6/2006 |
| WO | WO 2006/075235 * | 7/2006 |
| WO | WO2008086197 | 7/2008 |

OTHER PUBLICATIONS

Karczewicz, Marta, et al., "Improved Refinement Coefficients Coding", JVT-U132, 21st Meeting: Hangzhou, China, Oct. 17-20, 2006, pp. 1-5.
Ling, et al., "Bitplane Coding of DCT Coefficients for Image and Video Compression," Proceedings of the SPIE, SPIE, Bellingham, WA, vol. 3653, No. 1-2, 1998, pp. 500-508.
Macnicol, James et al., "Scalable Video Coding by Stream Morphing", IEEE Transactions on Circuits and Systems for Video Technology, vol. 15, No. 2, Feb. 2005, pp. 306-319.
Marpe, et al., "Improved CABAC for Progressive Refinement Slices," Joint Video Team (JVT) of ISO/IEC MPEG & ITU-T VCEG (ISO/IEC JTC1/SC29/WG11 and ITU-T SG16 Q.6, 20th Meeting: Klagenfurt, Austria, Jul. 15-21, 2006 No. JVT-T077, pp. 1-11.

Ridge, J. et al., "Improvement of FGS refinement". JVT-V077, 22nd Meeting: Marrakech, Morocco, Jan. 13-19, 2007, pp. 1-5.
Ridge, J., et al., "Variable Length Codes for SVC," Joint Video Team (JVT) of ISO/IEC MPEG & ITU-T VCEG (ISO/IEC JTC1/SC29/WG11 and ITU-T SG16 Q.6), 16th Meeting: Poznan, Poland, Jul. 24-29, 2005, No. JVT-P056, Jul. 24, 2005, XP0301006095, pp. 1-7.
Shima, M. "Modified VLC for Refinement Pass," Joint Video Team (JVT) of ISO/IEC MPEG & ITU-T VCEG (ISO/IEC JTC1/SC29/WG11 and ITU-T SG16 Q.6). 19th Meeting: Geneva, Switzerland, Mar. 31-Apr. 7, 2006, No. JVT-S031, Mar. 31, 2006, XP030006410, pp. 1-8.
TIA-1099, "Forward Link Only Air Interface Specification for Terrestrial Mobile Multimedia Multicast", Telecommunications Industry Association, Aug. 2006, pp. 1-168.
Wiegand, T. et al., "Joint Draft 6". JVT-S201, 19th Meeting: Geneva, Switzerland, Apr. 1-7, 2006, pp. 1-536.
Wiegand, T. et al., "Joint Draft 9 of SVC Amendment", JVT-V201, 22nd Meeting: Marrakech, Morocco, Jan. 13-19, 2007, pp. 1-498.
Ye, Y., et al., "Improvements to FGS Layer Variable Length Coder," Joint Video Team (JVT) of ISO/IEC MPEG & ITU-T VCEG (ISO/IEC JTC1/SC29/WG11 and ITU-T SG16 Q.6), 19th Meeting: Geneva, Switzerland, Mar. 31-Apr. 7, 2006, No. JVT-S066, Mar. 31, 2006, XP030006445, pp. 1-10.
International Search Report—PCT/US08/055830—International Search Authority, European Patent Office—Sep. 23, 2008.
Written Opinion—PCT/US08/055830—International Search Authority, European Patent Office—Sep. 23, 2008.
Ridge, J., et al., "CE8: VLCs for SVC," Joint Video Team (JVT) of ISO/IEC MPEG & ITU-T VCEG (ISO/IEC JTC1/SC29/WG11 and ITU-T SG16 Q.6, 17th Meeting: Nice, France, Oct. 14-21, 2005 No. JVT-Q040-L, Oct. 14, 2005, XP030006203, pp. 1-6.
Xianglin Wang et al, CE7 Report, Multiple FGS layer coding for low-delay applications, Joint Video Team (JVT) of ISO/IEC MPEG & ITU-T VCEG, JVT-R077, Jan. 14, 2006.
Yen-Kuang Chen et al, Implementation of Real-Time MPEG-4 FGS Encoder, Advances in Multimedia Information Processing—PCM 2002, Springer Berlin/Heidelberg, 2002, pp. 839-846.
Macnicol, James et al., "Scalable Video Coding by Stream Morphing," IEEE Transactions on Circuits and Systems for Video Technology, vol. 15, No. 2, Feb. 2005, pp. 306-319.
Nevdiaev L.M., Telecommunications Technology, English-Russian Explanatory Dictionary, Communications and Business, Moscow, 2002, pp. 103,136.
Taiwan Search Report—TW096138307—TIPO—Apr. 19, 2011.
Taiwan Search Report—TW097108236—TIPO—Jun. 5, 2011.
Gary J. Sullivan et al: Joint Video Team (JVT) of ISO/IEC MPEG & 14-22, ITU-T VCEG (ISO/IEC JTC1/SC29/WG11 and 24,25 ITU-T SG16 Q .6), (Mar./Apr. 2006).
Jian Zhou et al, FGS enhancement layer truncation with minimized intra-frame quality variation, Multimedia and Expo, 2003. Proceedings. 2003 International Conference on Jul. 6-9, 2003, Piscataway, vol. 2, Jul. 6, 2003, pp. 361-364.
Report of 78th meeting, International organization of standardization organization international de normalization ISO/IEC JTC 1/sc29/WG 11 coding of moving pictures and audio, p. 139, Oct. 2006.
Shima M: "CE1: Complexity reduction for adaptive VLC", Geneva: ISO, CH. Jan. 10, 2006, XP030006289.
Bae-Keun Lee and woo-Jin Han,VLC for FGS layer in 8x8 transform, Joint Video Team (JVT) of ISO/IEC MPEG & ITU-T VCEG (ISO/IEC JTC1/SC29/VVG11 and ITU-T SG16 Q.6) 17th Meeting: Nice, FR, Document: JVT-Q057, ITU-T, Oct. 14, 2005.
Bae-Keun Lee,CE1: Improvement CAVLC for SVC,Joint Video Team (JVT) of ISO/IEC MPEG & ITU-T VCEG (ISO/IEC JTC1/SC29/VVG11 and ITU-T SG16 Q.6) 17th Meeting: Nice, FR, Document: JVT-Q301, ITU-T, Oct. 21, 2005.
Julien Reichel et al., Draft of Joint Scalable Video Model JSVM-4 Annex G, Joint Video Team(JVT) of ISO/IEC Mpeg & ITU-T VCEG (ISO/IEC JTC1/SC29/WG11 and ITU-T SG16 Q.6) 17th Meeting: Nice, France, Document: JVT-Q201, Filename: JVT-Q202-AnnexG.doc, ITU-T, Nov. 18, 2005.
Karczewicz M., "Report of core experiment on improved refinement coefficients coding (CE1)", JVT-V095, Joint Video Team (JVT) of ISO/IEC MPEG & ITU-T VCEG, 22nd Meeting: Marrakech, Jan. 13-19, 2007, p. 1 para.3-p.2 para.7.

* cited by examiner

COMBINED RUN-LENGTH CODING OF REFINEMENT AND SIGNIFICANT COEFFICIENTS IN SCALABLE VIDEO CODING ENHANCEMENT LAYERS

This application claims the benefit of the following U.S. Provisional Applications, the entire content each of which is incorporated herein by reference:

U.S. Provisional Application No. 60/883,739, filed Jan. 5, 2007,

U.S. Provisional Application No. 60/829,276, filed Oct. 12, 2006, and

U.S. Provisional Application No. 60/893,586, filed Mar. 7, 2007.

TECHNICAL FIELD

This disclosure relates to digital video coding and, more particularly, run-length coding of transform coefficients in enhancement layers of a scalable video coding (SVC) scheme.

BACKGROUND

Digital video capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

In video coding, video compression generally includes spatial prediction, motion estimation and motion compensation. Intra-coding relies on spatial prediction to reduce or remove spatial redundancy between video blocks within a given video frame. Inter-coding relies on temporal prediction to reduce or remove temporal redundancy between video blocks of successive video frames of a video sequence. For inter-coding, a video encoder performs motion estimation to track the movement of matching video blocks between two or more adjacent frames. Motion estimation generates motion vectors, which indicate the displacement of video blocks relative to corresponding prediction video blocks in one or more reference frames. Motion compensation uses the motion vector to generate the prediction video block from a reference frame. After motion compensation, a residual video block is formed by subtracting the prediction video block from the original video block to be coded.

The video encoder may apply transform, quantization and run-length coding processes to further reduce the bit rate associated with communication of the residual block. In run-length coding, a sequence of coefficients may be coded using a run value, a level value, and a sign value. Run-length coding algorithms may scan through transform coefficients of a video block, e.g., in a zig-zag manner, in order to identify sequences of zeros that can be coded together. The run value identifies a sequence of zeros, and the level value identifies the value of the coefficient following the sequence of zeros. The level value may be presumed to be 1 in some cases, e.g., when the magnitude of any coefficient is limited to values of −1, 0 or 1. The sign value identifies the sign associated with the level value.

In some cases, a variable length coding (VLC) table may be used to code different run values in a manner that promotes coding efficiency, and different VLC tables may be used for different video content. A video decoder performs inverse operations to reconstruct the coefficients, and then inverse transforms the coefficients. The video decoder then decodes the video information based on the motion information and residual information associated with video blocks.

Some video coding makes use of scalable techniques. For example, scalable video coding (SVC) refers to video coding in which a base layer and one or more scalable enhancement layers are used. For SVC, a base layer typically carries video data with a base level of quality. One or more enhancement layers carry additional video data to support higher spatial, temporal and/or SNR levels. The base layer may be transmitted in a manner that is more reliable than the transmission of enhancement layers. For example, the most reliable portions of a modulated signal may be used to transmit the base layer, while less reliable portions of the modulated signal may be used to transmit the enhancement layers. Enhancement layers may define different types of coefficients, referred to as significant coefficients and refinement coefficients.

SUMMARY

In general, this disclosure describes techniques for coding an enhancement layer in a scalable video coding (SVC) scheme. The techniques involve run-length coding of significant coefficients and refinement coefficients of the enhancement layer. Rather than performing two different run-length passes to separately code the significant coefficients and refinement coefficients, the techniques of this disclosure perform combined run-length coding of the significant coefficients and refinement coefficients. In other words, run-length coding of the significant coefficients and refinement coefficients is performed together in a single coding pass. Therefore, run values of the run-length coding codes the significant coefficients with the refinement coefficients. Additional techniques are also described, which can eliminate the need to send sign information for some of the refinement coefficients. Instead, this sign information for some of the refinement coefficients may be derived at the decoder based on the sign values of corresponding coefficients of previously encoded layers of the SVC scheme, which can further improve compression efficiency.

In one example, this disclosure provides a method of coding an enhancement layer in an SVC scheme comprising run-length coding significant coefficients and refinement coefficients of the enhancement layer together such that run values of the run-length coding codes the significant coefficients with the refinement coefficients.

In another example, this disclosure provides a device comprising a run-length coding unit configured to code an enhancement layer in an SVC scheme, wherein the run-length coding unit run-length codes significant coefficients and refinement coefficients of the enhancement layer together such that run values of the run-length coding codes the significant coefficients with the refinement coefficients.

In another example, this disclosure provides a device comprising means for coding an enhancement layer in an SVC scheme, wherein the means for coding performs run-length coding on significant coefficients and refinement coefficients of the enhancement layer together such that run values of the run-length coding codes the significant coefficients with the refinement coefficients.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution in a video coding device cause the device to code an enhancement layer in an SVC scheme, wherein the instructions cause the device to run-length code significant coefficients and refinement coefficients of the enhancement layer together such that run values of the run-length coding codes the significant coefficients with the refinement coefficients. In some cases, the computer readable medium may form part of a computer program product, which may be sold to manufactures and/or used in a video coding device. The computer program product may include a computer readable medium, and in some cases, may also include packaging materials.

In other cases, this disclosure may be directed to a circuit, such as an integrated circuit, chipset, application specific integrated circuit (ASIC), field programmable gate array (FPGA), logic, or various combinations thereof configured to perform one or more of the techniques described herein.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
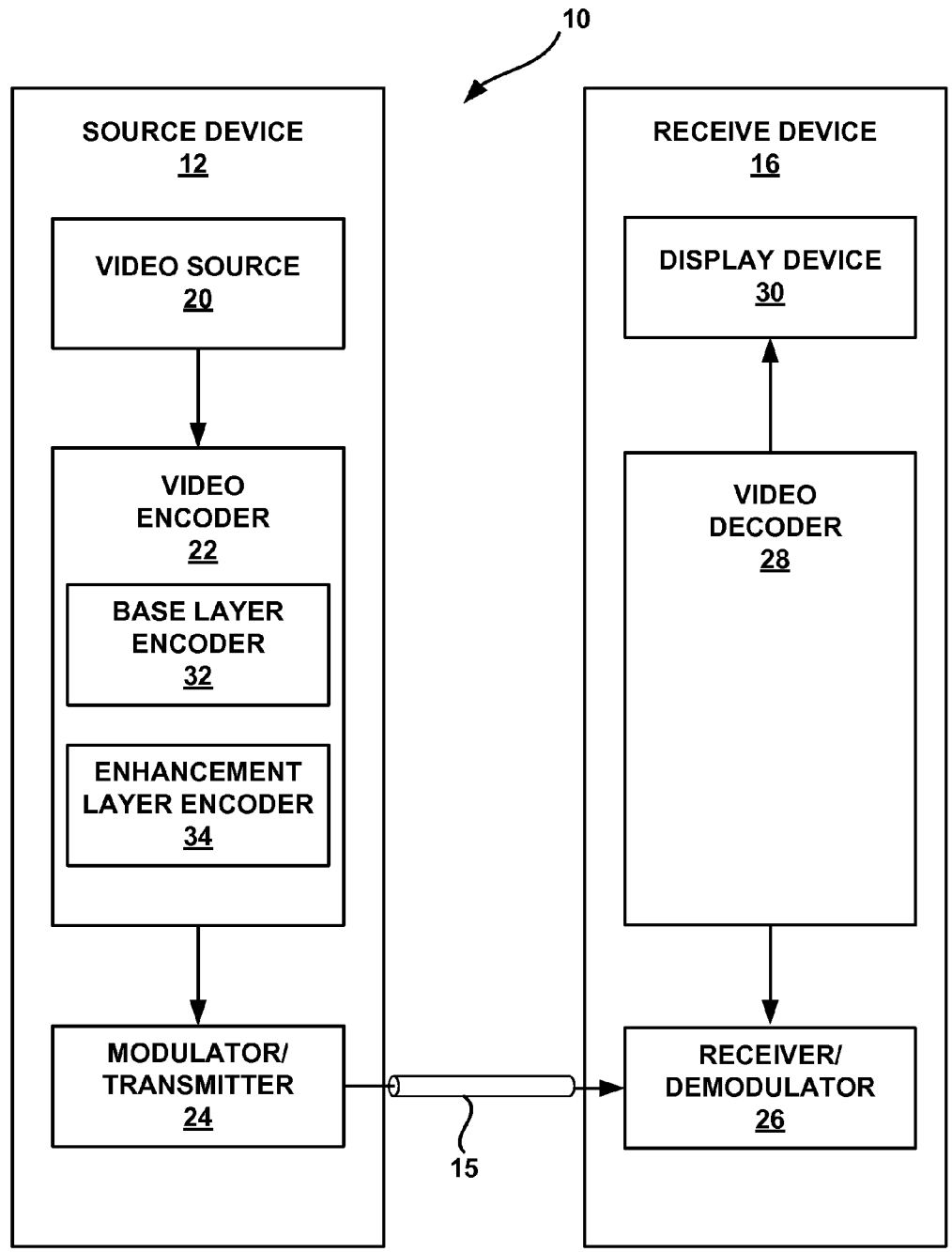
FIG. 1 is an exemplary block diagram illustrating a video encoding and decoding system.

FIG. 1 is a block diagram illustrating a video encoding and decoding system 10. As shown in FIG. 1, system 10 includes a source device 12 that transmits encoded video to a receive device 16 via a communication channel 15. Source device 12 may include a video source 20, video encoder 22 and a modulator/transmitter 24. Receive device 16 may include a receiver/demodulator 26, video decoder 28, and display device 30. System 10 may be configured to apply techniques for run-length coding of video information associated with an enhancement layer in a scalable video coding (SVC) scheme. The transmitter of source device 12 and the receiver of receive device 16 are both examples of a means for communicating.

SVC refers to video coding in which a base layer and one or more scalable enhancement layers are used. For SVC, a base layer typically carries video data with a base level of quality. One or more enhancement layers carry additional video data to support higher spatial, temporal and/or signal-to-noise SNR levels. Enhancement layers may be defined relative to the previously encoded layer. Enhancement layers define at least two different types of coefficients, referred to as significant coefficients and refinement coefficients. Refinement coefficients may define values relative to the corresponding values of the previously encoded layer.

Refinement coefficients refer to coefficients of an enhancement layer for which the corresponding coefficients of a previous layer in the SVC scheme had non-zero values. In contrast, significant coefficients refer to coefficients of an enhancement layer for which the corresponding coefficients of a previous layer in the SVC scheme had values of zero. Conventionally, run-length coding of enhancement layers involves a two-pass approach. A first pass is performed to run-length code the significant coefficients, and another pass is performed to code the refinement coefficients.

In accordance with this disclosure, however, devices 12 and 16 perform run-length coding of the significant coefficients and refinement coefficients together. Therefore, run values of the run-length coding codes the significant coefficients with the refinement coefficients. Furthermore, devices 12 and 16 may perform additional techniques that may eliminate the need for source device 12 to send sign information for some of the refinement coefficients. Instead, this sign information for some of the refinement coefficients may be derived at receive device 16, which can further improve compression efficiency.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to receive device 16.

Source device 12 generates coded video data for transmission to receive device 16. In some cases, however, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video and computer-generated video. In some cases, if video source 20 is a video camera, source device 12 and receive device 16 may form so-called camera phones or video phones. In each case, the captured, pre-captured or computer-generated video may be encoded by video encoder 22 for transmission from video source device 12 to video decoder 28 of video receive device 16 via modulator/transmitter 22, communication channel 15 and receiver/demodulator 26. The video encoding and decoding processes may implement the run-length coding techniques described herein to improve the processes. Display device 30 displays the decoded video data to a user, and may comprise any of a variety of display devices such as a cathode ray tube, a liquid crystal display (LCD), a plasma display, an organic light emitting diode (OLED) display, or another type of display device.

Video encoder 22 and video decoder 28 may be configured to support SVC for spatial, temporal and/or signal-to-noise ratio (SNR) scalability. In some aspects, video encoder 22 and video decoder 28 may be configured to support fine granularity SNR scalability (FGS) coding for SVC. Encoder 22 and decoder 28 may support various degrees of scalability by supporting encoding, transmission and decoding of a base layer and one or more scalable enhancement layers. Again, for scalable video coding, a base layer carries video data with a baseline level of quality. One or more enhancement layers carry additional data to support higher spatial, temporal and/or SNR levels. The base layer may be transmitted in a manner that is more reliable than the transmission of enhancement layers. For example, the most reliable portions of a modulated signal may be used to transmit the base layer, while less reliable portions of the modulated signal may be used to transmit the enhancement layers.

In order to support SVC, video encoder 22 may include a base layer encoder 32 and one or more enhancement layer encoders 34 to perform encoding of a base layer and one or more enhancement layers, respectively. The techniques of this disclosure, which involve run-length coding of the significant coefficients with the enhancement coefficients, are applicable to the coding of video blocks of enhancement layers in SVC.

Video decoder 28 may include a combined base/enhancement decoder that decodes the video blocks associated with both base and enhancement layers. Vide decoder 28 may decode the video blocks associated with both base and enhancement layers, and combine the decoded video to reconstruct the frames of a video sequence. Display device 30 receives the decoded video sequence, and presents the video sequence to a user.

Video encoder 22 and video decoder 28 may operate according to a video compression standard, such as MPEG-2, MPEG-4, ITU-T H.263, or ITU-T H.264/MPEG-4, Part 10, Advanced Video Coding (AVC). Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification.

The Joint Video Team (JVT) continues to work on an SVC extension to H.264/MPEG-4 AVC. The specification of the evolving SVC extension is in the form of a Joint Draft (JD). The Joint Scalable Video Model (JSVM) created by the JVT implements tools for use in scalable video, which may be used within system 10 for various coding tasks described in this disclosure. Detailed information concerning Fine Granularity SNR Scalability (FGS) coding can be found in the Joint Draft documents, and particularly in Joint Draft 6 (SVC JD6), Thomas Wiegand, Gary Sullivan, Julien Reichel, Heiko Schwarz, and Mathias Wien, "Joint Draft 6: Scalable Video Coding," JVT-S 201, April 2006, Geneva, and in Joint Draft 9 (SVC JD9), Thomas Wiegand, Gary Sullivan, Julien Reichel, Heiko Schwarz, and Mathias Wien, "Joint Draft 9 of SVC Amendment," JVT-V 201, January 2007, Marrakech, Morocco.

In some aspects, for video broadcasting, the techniques described in this disclosure may be applied to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). That is to say, communication channel 15 may comprise a wireless information channel used to broadcast wireless video information according to the FLO Specification, or the like. The FLO Specification includes examples defining bitstream syntax and semantics and decoding processes suitable for the FLO Air Interface. Alternatively, video may be broadcasted according to other standards such as DVB-H (digital video broadcast—handheld), ISDB-T (integrated services digital broadcast—terrestrial), or DMB (digital media broadcast). Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple receive devices, each of which may be similar to receive device 16 of FIG. 1.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like. In addition, source device 12 and receive device 16 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are summarized as being modulator/transmitter 24 of source device 12 and receiver/demodulator 26 of receive device 16 in FIG. 1.

A video sequence includes a series of video frames. Video encoder 22 operates on video blocks within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform. The run-length coding techniques of this disclosure apply to video blocks of transformation coefficients.

Smaller video blocks can provide better resolution, and may be used for locations of a video frame that include higher levels of detail. In general, macroblocks (MBs) and the various sub-blocks may be considered to be video blocks. In addition, a slice may be considered to be a series of video blocks, such as MBs and/or sub-blocks. Each slice may be an independently decodable unit of a video frame. After prediction, a transform may be performed on the 8×8 residual block or 4×4 residual block, and an additional transform may be applied to the DC coefficients of the 4×4 blocks for chroma components or luma component if an intra_16×16 prediction mode is used. Again, following the transformation, the data may still be referred to as being video blocks, i.e., blocks of transformation coefficients.

Following intra- or inter-based predictive coding and transformation techniques (such as the 4×4 or 8×8 integer transform used in H.264/AVC or a discrete cosine transform DCT), run-length coding may be performed. This disclosure provides techniques for combined run-length coding of refinement coefficients and significant coefficients of an enhancement layer, which may be performed at encoder 22 to encode the data, and at decoder 26 to decode the data. Again, significant coefficients refer to coefficients that had values of zero in the previous layer, and refinement coefficients refer to coefficients that had non-zero values in the previous layer. Conventionally, run-length coding of enhancement layers involves a two-pass approach, one pass for run-length coding the significant coefficients and another pass for run-length coding the refinement coefficients.

According to the techniques of this disclosure, run-length coding of enhancement layers involves a one-pass approach that codes significant coefficients with the refinement coefficients. Variable length coding (VLC) tables may be used in the run-length coding scheme. For example, VLC tables may be used to code run-lengths, and in some cases, different tables may be selected based on content, which may be represented by various statistics such as run-length counts, end-of-block position counts, or the like. Run-length information may define the table index, and may define a sequence of encoded zeros of video information, which may be significant or refinement coefficients having such zero values. The run-length information may be used to select the appropriate code word from a selected VLC table for transmission to the decoding device.

Encoder 22 and decoder 28 may perform reciprocal methods that code an enhancement layer in the SVC scheme by run-length coding significant coefficients and refinement coefficients of the enhancement layer together such that run values of the run-length coding codes the significant coefficients with the refinement coefficients. The term coding generally refers to either the encoding or decoding processes. Video encoder 22 encodes the data, while video decoder 28 decodes the data.

Figure 2:
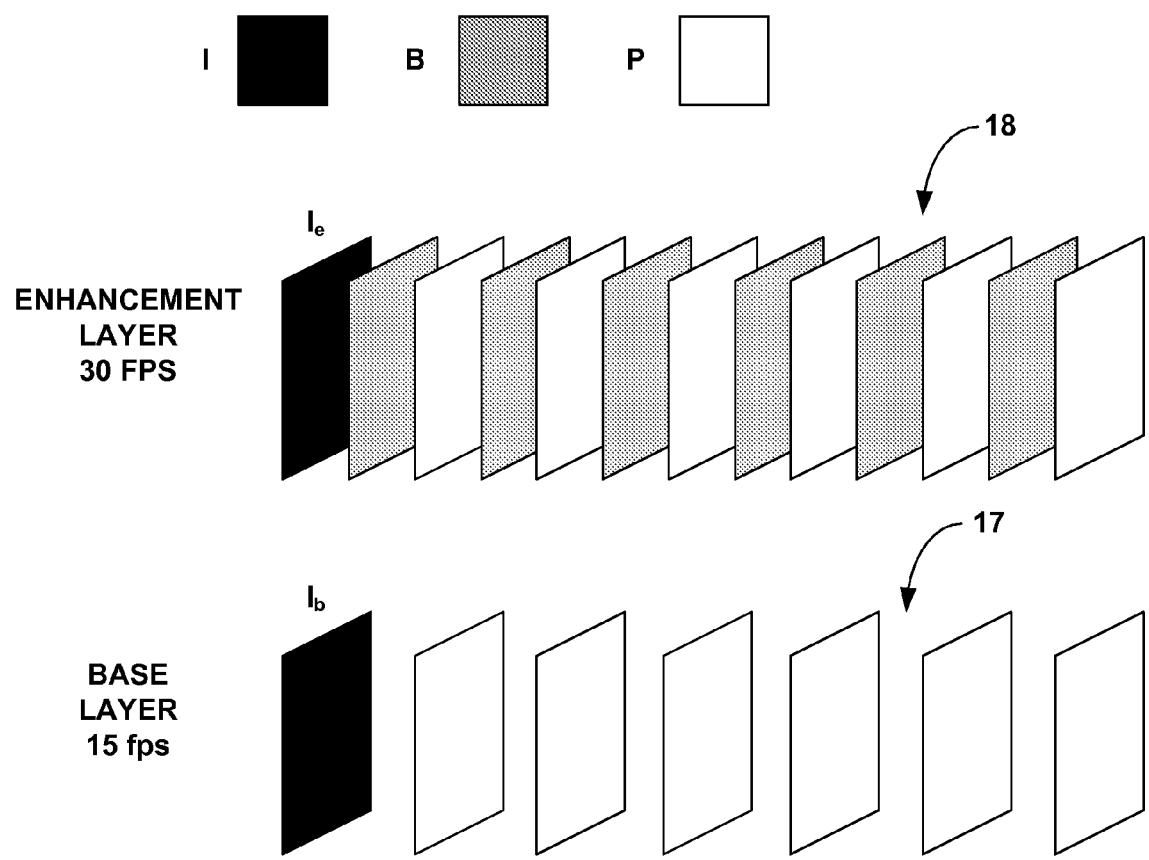
FIG. 2 is a conceptual diagram illustrating video frames of a base layer and an enhancement layer of a scalable video bitstream.

FIG. 2 is a diagram illustrating video frames within a base layer 17 and enhancement layer 18 of a scalable video bitstream. As noted above, the techniques of this disclosure are applicable to the coding of data of enhancement layers. Base layer 17 may comprise a bitstream containing encoded video data that represents the first level of spatial, temporal, or SNR scalability. Enhancement layer 18 may comprise a bitstream containing encoded video data that represents a second level of spatial, temporal and/or SNR scalability. Although a single enhancement layer is shown, several layers of enhancement may be used in some cases. The enhancement layer bitstream may be decodable only in conjunction with the base layer (or previous enhancement layer if multiple enhancement layer exist). Enhancement layer 18 contains references to the decoded video data in base layer 17. Such references may be used either in the transform domain or pixel domain to generate the final decoded video data.

Base layer 17 and enhancement layer 18 may contain intra (I), inter (P), and bi-directional (B) frames. The P frames in enhancement layer 18 rely on references to P frames in base layer 17. By decoding frames in enhancement layer 18 and base layer 17, a video decoder is able to increase the video quality of the decoded video. For example, base layer 17 may include video encoded at a minimum frame rate of e.g., 15 frames per second, whereas enhancement layer 18 may include video encoded at a higher frame rate of e.g., 30 frames per second. To support encoding at different quality levels, base layer 17 and enhancement layer 18 may be encoded with a higher quantization parameter (QP) and lower QP, respectively. Moreover, base layer 17 may be transmitted in a manner that is more reliable than the transmission of enhancement layer 18. As an example, the most reliable portions of a modulated signal may be used to transmit base layer 17, while less reliable portions of the modulated signal may be used to transmit enhancement layer 18. In some cases, the frame rate of base layer 17 may be less than that of enhancement layer 18. The illustration of FIG. 2 is merely exemplary, as base and enhancement layers could be defined in many different ways.

Figure 3:
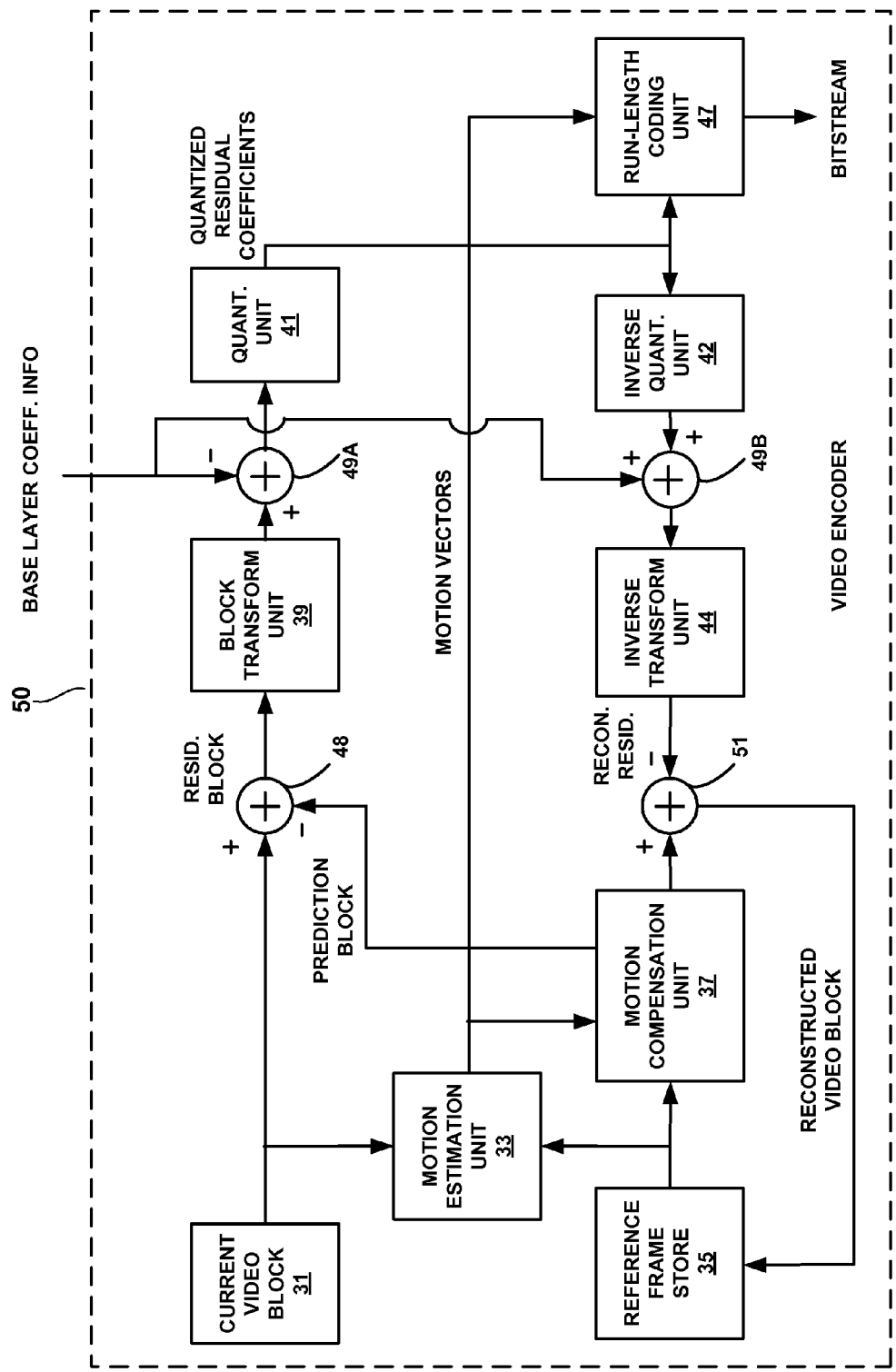
FIG. 3 is a block diagram illustrating an example of a video encoder consistent with this disclosure.

FIG. 3 is a block diagram illustrating an example of a video encoder 50 that includes a run-length coding unit 47 to encode data consistent with this disclosure. Video encoder 50 of FIG. 3 may correspond to enhancement layer encoder 24 of source device 2 in FIG. 1. That is to say, base layer encoding components are not illustrated in FIG. 3 for simplicity. Therefore, video encoder 50 may be considered an enhancement layer encoder. Alternatively, the illustrated components of video encoder 50 could also be implemented in combination with base layer encoding modules or units, e.g., in a pyramid encoder design that supports scalable video coding of the base layer and the enhancement layer.

Video encoder 50 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 50 performs motion estimation to track the movement of matching video blocks between two or more adjacent frames. For intra-coding, spatial prediction is used to identify other blocks within a frame that closely match the block being coded. Intra-coding, spatial prediction components, are not illustrated in FIG. 3.

As shown in FIG. 3, video encoder 50 receives a current video block 31 (e.g., an enhancement layer video block) within a video frame to be encoded. In the example of FIG. 3, video encoder 50 includes motion estimation unit 33, reference frame store 35, motion compensation unit 37, block transform unit 39, quantization unit 41, inverse quantization unit 42, inverse transform unit 44 and VLC unit 46. A deblocking filter (not shown) may also be included to filter block boundaries to remove blockiness artifacts. Video encoder 50 also includes summer 48 and summer 51. FIG. 3 illustrates the temporal prediction components of video encoder 50 for inter-coding of video blocks. Although not shown in FIG. 3 for ease of illustration, video encoder 50 also may include spatial prediction components for intra-coding of some video blocks. Spatial prediction components, however, are usually used only for base layer coding.

Motion estimation unit 33 compares video block 31 to blocks in one or more adjacent video frames to generate one or more motion vectors. The adjacent frame or frames may be retrieved from reference frame store 35, which may comprise any type of memory or data storage device to store video blocks reconstructed from previously encoded blocks. Motion estimation may be performed for blocks of variable sizes, e.g., 16×16, 16×8, 8×16, 8×8 or smaller block sizes. Motion estimation unit 33 identifies a block in an adjacent frame that most closely matches the current video block 31, e.g., based on a rate distortion model, and determines a displacement between the blocks. On this basis, motion estimation unit 33 produces a motion vector (MV) (or multiple MV's in the case of bidirectional prediction) that indicates the magnitude and trajectory of the displacement between current video block 31 and a predictive block used to code current video block 31.

Motion vectors may have half- or quarter-pixel precision, or even finer precision, allowing video encoder 50 to track motion with higher precision than integer pixel locations and obtain a better prediction block. When motion vectors with fractional pixel values are used, interpolation operations are carried out in motion compensation unit 37. Motion estimation unit 33 may identify the best motion vector for a video block using a rate-distortion model. Using the resulting motion vector, motion compensation unit 37 forms a prediction video block by motion compensation.

Video encoder 50 forms a residual video block by subtracting the prediction video block produced by motion compensation unit 37 from the original, current video block 31 at summer 48. Block transform unit 39 applies a transform, such as a discrete cosine transform (DCT), to the residual block, producing residual transform block coefficients. Quantization unit 41 quantizes the residual transform block coefficients to further reduce bit rate. Summer 49A receives base layer coefficient information, e.g., from a base layer encoder (not show) and is positioned between block transform unit 39 and quantization unit 41 to supply this base layer coefficient information into the enhancement layer coding. In particular, summer 49A subtracts the base layer coefficient information from the output of block transform unit 39. In a similar fashion, summer 49B, which is positioned between inverse transform unit 44 and inverse quantization unit 42, also receives the base layer coefficient information from the base layer encoder (not shown). Summer 49B adds the base layer coefficient information back to the output of inverse quantization unit 42.

Spatial prediction coding operates very similar to temporal prediction coding. However, whereas temporal prediction coding relies on blocks of adjacent frames (or other coded units) to perform the coding, spatial prediction relies on blocks of within a common frame (other coded unit) to perform the coding. Spatial prediction coding codes intra blocks, while temporal prediction coding codes inter blocks. Again, the spatial prediction components are not shown in FIG. 3 for simplicity.

Run-length coding unit 47 codes the quantized transform coefficients according a variable length coding methodology to even further reduce the bit rate of transmitted information. In particular, run-length coding unit 47 applies techniques of this disclosure to run-length code the significant coefficients of an enhancement layer with the refinement coefficients. Furthermore, run-length coding unit 47 may perform additional techniques to eliminate the need to send sign information for at least some of the refinement coefficients. Additional details of these techniques are provided in the discussion below.

Following the run-length coding, the encoded video may be transmitted to another device. In addition, inverse quantization unit 42 and inverse transform unit 44 apply inverse quantization and inverse transformation, respectively, to reconstruct the residual block. Summer 51 adds the reconstructed residual block to the motion compensated prediction block produced by motion compensation unit 37 to produce a reconstructed video block for storage in reference frame store 35. The reconstructed video block is used by motion estimation unit 33 and motion compensation unit 37 to encode a block in a subsequent video frame.

Figure 4:
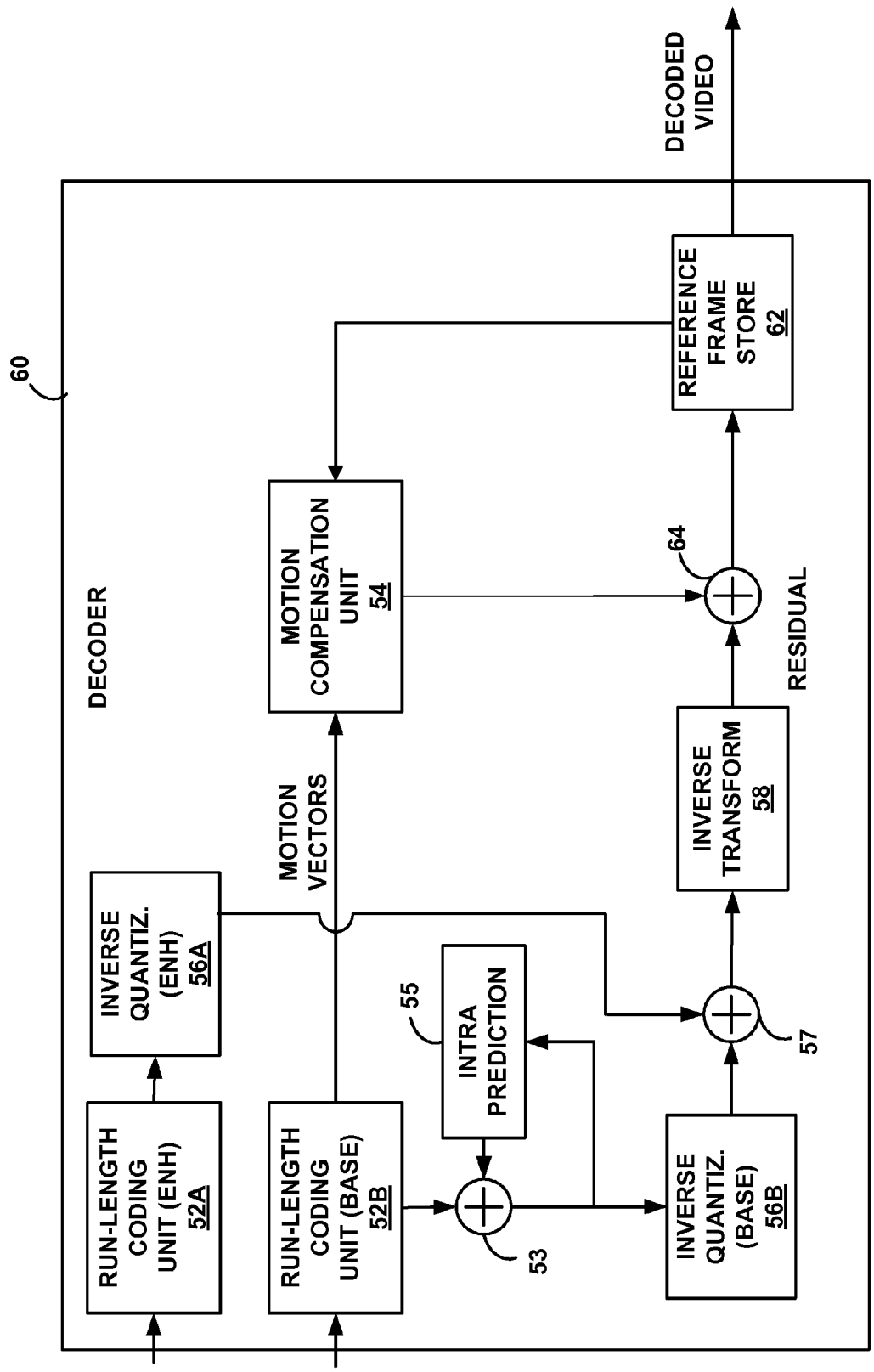
FIG. 4 is a block diagram illustrating an example of a video decoder consistent with this disclosure.

FIG. 4 is a block diagram illustrating an example of a video decoder 60, which may correspond to video decoder 28 of FIG. 1, or a decoder of another device. Video decoder 60 includes a run-length coding unit 52A for enhancement layer information, which performs the reciprocal function of run-length coding unit 47 of FIG. 3. That is to say, like run-length coding unit 47, run-length coding unit 52A run-length codes the significant coefficients of an enhancement layer with the refinement coefficients. Furthermore, run-length coding unit 52A may perform additional techniques to derive sign information for at least some of the refinement coefficients, which may be excluded from the bitstream.

Video decoder 60 may also include another run-length coding unit 52B for base layer information. Intra prediction unit 55 may optionally perform any spatial decoding of base layer video blocks, and the output of intra prediction unit 55 may be provided to adder 53. The enhancement layer path may include inverse quantization unit 58A, and the base layer path may include inverse quantization unit 56B. The information in the base layer and enhancement layer paths may be combined by adder 57.

Video decoder 60 may perform intra- and inter-decoding of blocks within video frames. In the example of FIG. 4, video decoder 60 includes run-length coding units 52A and 52B (mentioned above), motion compensation unit 54, inverse quantization units 56A and 56B, inverse transform unit 58, and reference frame store 62. Video decoder 60 also includes summer 64. Optionally, video decoder 60 also may include a deblocking filter (not shown) that filters the output of summer 64. Again, summer 57 combines information in the base layer and enhancement layer paths, and intra prediction unit 55 and adder 53 facilitate any spatial decoding of base layer video blocks.

In accordance with this disclosure, run-length coding unit 52A receives an encoded video bitstream and applies a run-length coding technique as described in this disclosure. This may produce quantized residual coefficients, macroblock and sub-block coding mode and motion information, which may include motion vectors and block partitions. In particular, run-length coding unit 52A uses a run-length decoding technique that assumes that the refinement and significant coefficients were run-length encoded together.

Following the decoding performed by run-length coding unit 52A, motion compensation unit 54 receives the motion vectors and one or more reconstructed reference frames from reference frame store 62. Inverse quantization unit 56A inverse quantizes, i.e., de-quantizes, the quantized block coefficients. Following combination of the enhancement and base layer information by adder 57, inverse transform unit 58 applies an inverse transform, e.g., an inverse DCT, to the coefficients to produce residual blocks. Motion compensation unit 54 produces motion compensated blocks that are summed by summer 64 with the residual blocks to form decoded blocks. If desired, a deblocking filter may also be applied to filter the decoded blocks in order to remove blockiness artifacts. The filtered blocks are then placed in reference frame store 62, which provides reference blocks from motion compensation and also produces decoded video to a drive display device (such as device 30 of FIG. 1).

Figure 5:
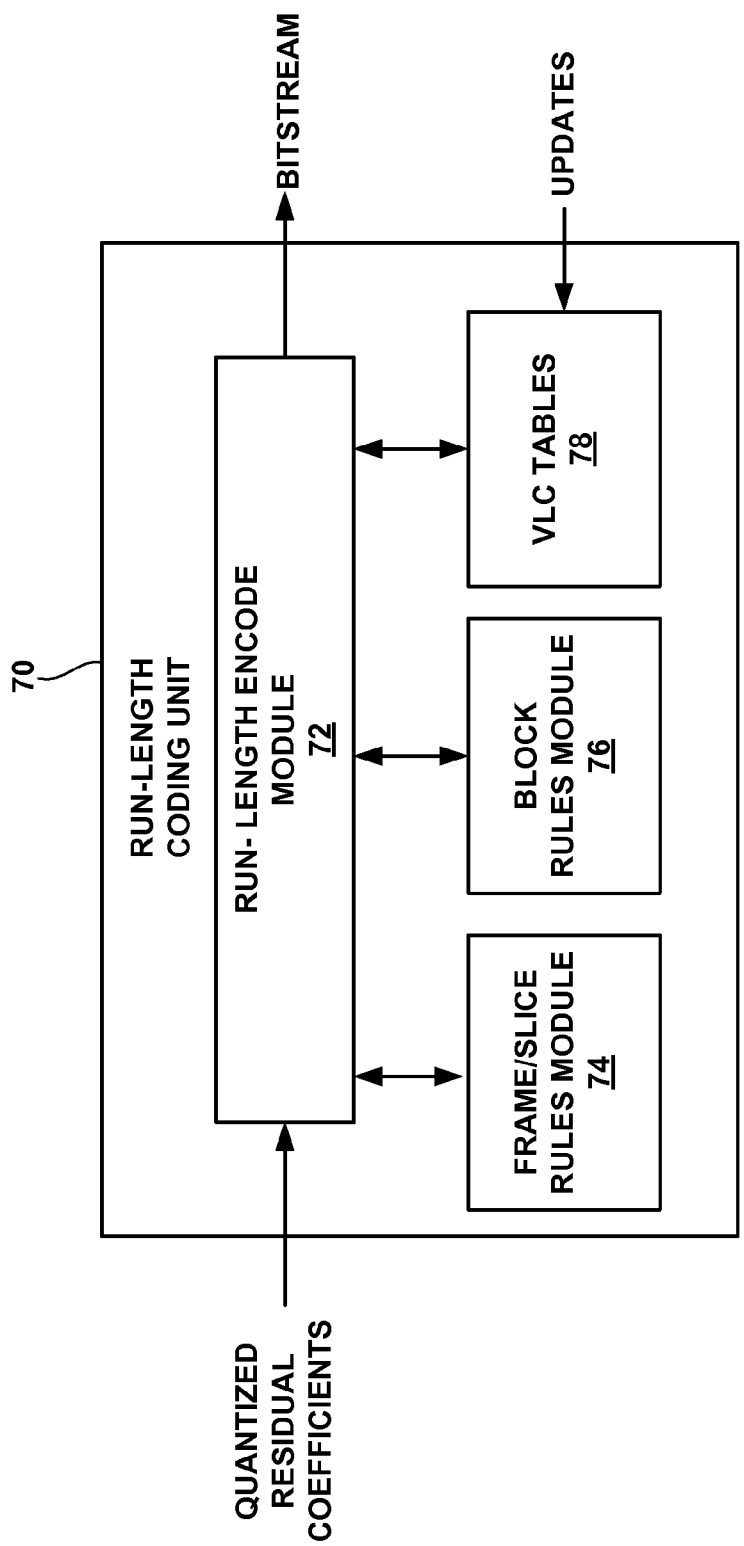
FIG. 5 is an exemplary block diagram of a run-length coding unit that may be used for encoding.

FIG. 5 is a block diagram illustrating an exemplary run-length coding unit 70, which may correspond to run-length coding unit 47 of FIG. 3. Run-length coding unit 70 includes a run-length encode module 72, a frame/slice rules module 74, a block rules module 76 and one or more VLC tables 78. VLC tables 78 generally refer to tables that may be stored in any location, e.g., locally or off-chip in a separate memory location. VLC tables 78 may be updated from time to time, or periodically over the course of the coding process, as desired.

Run-length encode module 72 run-length codes significant coefficients and refinement coefficients of the enhancement layer together such that run values of the run-length coding code the significant coefficients with the refinement coefficients. In other words, rather than performing two different run-length coding passes for significant coefficients and refinement coefficients, run-length module 72 codes the significant coefficients and refinement coefficients together in a single run-length pass. The run-length coding may scan all the coefficients of a transformed video block, e.g., in a zig-zag manner, without regard to whether the coefficients are refinement or significant coefficients. Of course, the manner in which a video block is scanned, e.g., zig-zag or otherwise, could be changed without departing from this disclosure.

Refinement coefficients may have values restricted to −1, 0 and 1, which may be coded by two bits of information. The first bit may indicate whether the coefficient is equal to 0 or not, and the second bit may indicate whether the sign (denoted as $s_n$) of the refinement coefficient is the same as (coeff_ref_dir_flag=0) or different (coeff_ref_dir_flag=1) than the sign (denoted as $s_{n-1}$) of the corresponding coefficient of the previous layer. The previous layer is denoted as $s_{n-1}$. If the sign of a current coefficient is the same as that of the previous layer, then coeff_ref_dir_flag=0. If the sign of current coefficient is different than that of the previous layer, then coeff_ref_dir_flag=1. The two refinement bits may be combined into an alphabet of three refinement symbols as follows in Table 1:

TABLE 1

| coeff_ref_flag | coeff_ref_dir_flag | ref_symbol |
|---|---|---|
| 0 | — | 0 |
| 1 | 0 | 1 |
| 1 | 1 | 2 |

This disclosure recognizes that a high level of correlation of the sign of refinement coefficients exists relative to the corresponding coefficients of previous layers of the SVC scheme. Using this basis, rules may be defined to allow the sign information of some of the refinement coefficients to be eliminated from the run-length coded information for those coefficients. Instead, this sign information may be derived at the decoder. Refinement coefficients can be coded as 1, 0 or −1, and the zero values may be included in run values that include both refinement and significant coefficients.

To take advantage of this correlation, run-length coding unit 70 may include rules module 74 and rules module 76. Rules modules 74 and 76 define one or more refinement coefficient rules to facilitate determinations of sign information associated with at least some of the refinement coefficients. In this case, such sign information may be excluded from run-length coded information.

Frame/slice rules module 74 generally defines one or more rules for a coded unit (e.g., a frame, a slice, or another type of coded unit). Block rules module 76 defines one or more rules for a given video block within the coded unit. For example, a first rule defined by module 74 may indicate for each of two or more types of video blocks (e.g., intra coded blocks and inter coded blocks) whether sign information should be kept the same or changed relative to corresponding coefficients of a previous layer in the SVC scheme. A second rule defined by module 76 may indicate whether the first rule should be applied or ignored for the given video block.

More specifically, the first rule may indicate for intra coded blocks or inter coded blocks whether the signs of refinement coefficients should stay the same or should be inverted (i.e., flipped) relative to the corresponding coefficients of a previous layer in the SVC scheme. If this achieves efficiency for a given video block, the second rule may indicate that the first rule should be followed for that block. Alternatively, if the first rule does not achieve efficiency for a given video block, the second rule may indicate that the first rule should be ignored for that block. The first rule may be set at the beginning of each frame (or slice) to be coded, and the second rule may be set at the beginning of each video block to be coded. Thus, the first rule may be referred to a coded unit rule, and the second rule may be referred to as a block rule.

When the second rule indicates that the first rule should be ignored for a given video block, sign information of the refinement coefficients of the given video block is included in the run-length coded information for the given video block. When the second rule indicates that the first rule should be applied, the sign information of the refinement coefficients of the given video block is not included in the run-length coded information for the given video block. The transmitted bitstream may include both the run-length coded information and additional information that defines the refinement coefficient rules.

VLC tables 78 may define mappings between different run values and variable length codes that can be transmitted to convey the different run values. Updates to VLC tables 78 may be made, as needed, and different tables may be selected based on the content, which may be represented by various statistics such as run-length counts, end-of-block position counts, or the like. In any case, the VLC tables may map highly probable run values to shorter variable length codes, and may map less probable run values to longer variable length codes.

As an alternative, the run-length coding performed by module 72 may include table lookups into VLC tables 78 based on multiple input values, e.g., pairs of values. The pairs of values may include the run values and second values that depend on a type associated with a video block being coded (e.g., intra or inter). In this case, the different rules for different types of coded blocks may be included as part of the table lookups. Thus, the second values, which depend on the type of video block being coded (e.g., intra or inter), may replace one or more of the rules described above. Instead, the information conveyed by the rules may be embedded into the VLC tables, and the table lookups can be based on the run values and second values that depend on a type associated with a video block being coded.

Furthermore, even more complex tables may be defined having more than two inputs to define the codewords. These alternative techniques may also eliminate the need to send sign information, essentially embedding such derivable sign information into the table lookups. However, the number of code words in the table would be increased relative to techniques that use one-input tables based on run values, and convey rules information to allow for derivation of the sign information for some of the refinement coefficients at the decoder. In this case, the "rule" information may be essentially replaced by a multiple input table lookup.

Figure 6:
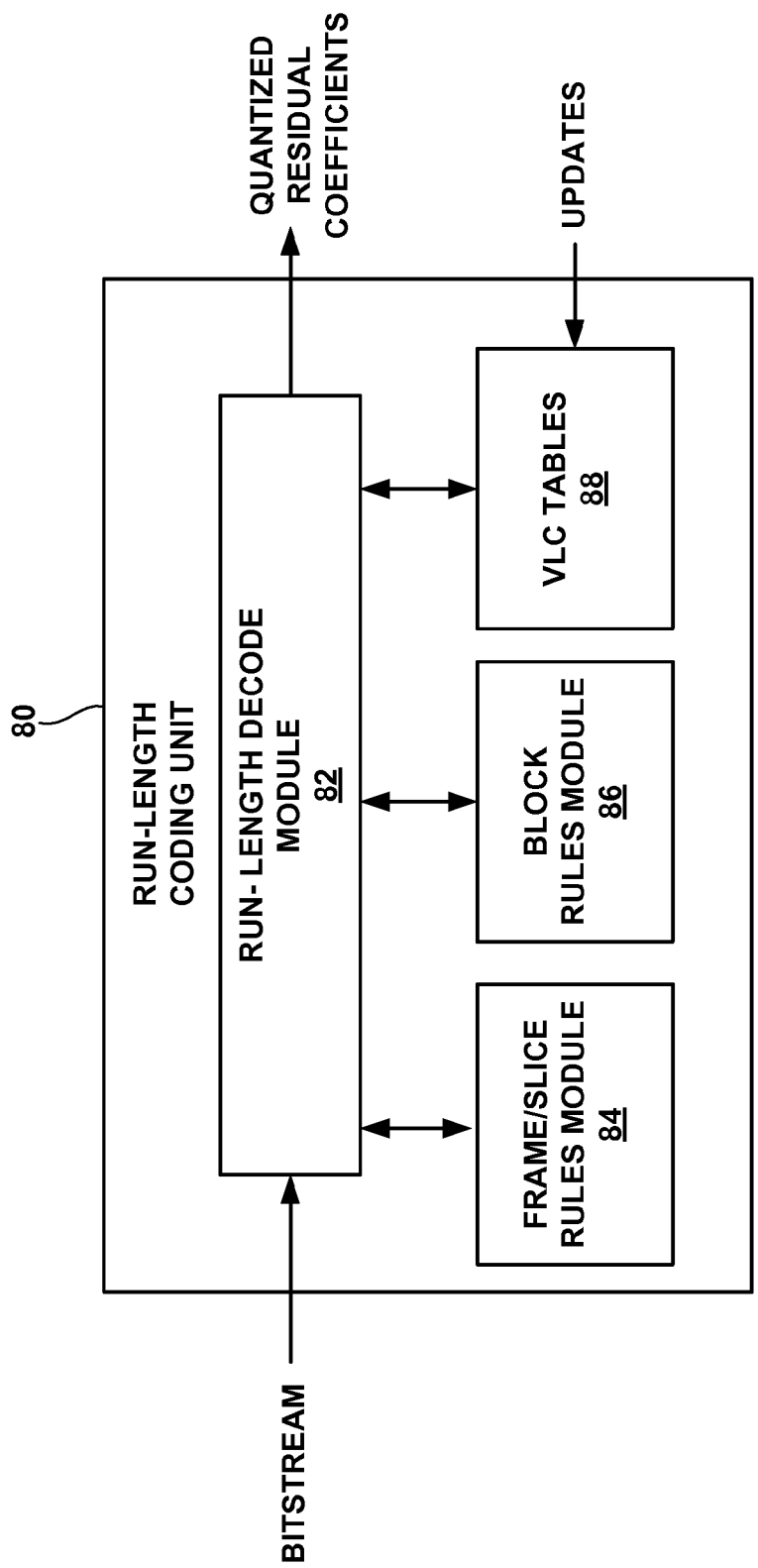
FIG. 6 is an exemplary block diagram of a run-length coding unit that may be used for decoding.

FIG. 6 is a block diagram illustrating an exemplary run-length coding unit 80, which may correspond to run-length coding unit 52 of FIG. 4. Run-length coding unit 80 is substantially similar to run-length coding unit 70, but performs reciprocal decoding functions relative to the encoding that is performed by run-length coding unit 70. Thus, whereas run-length coding unit 70 receives quantized residual coefficients and generates a bitstream, run-length coding unit 80 receives a bitstream and generates quantized residual coefficients. Run-length coding unit 80 includes a run-length decode module 82, a frame/slice rules module 84, a block rules module 86 and one or more VLC tables 88. Like in unit 70, VLC tables 88 of run-length coding unit 80 generally refer to tables that may be stored in any location, e.g., locally or off-chip in a separate memory location. VLC tables 88 may be updated, periodically, as desired.

Run-length decode module 82 performs run-length decoding of significant coefficients and refinement coefficients of the enhancement layer together. The run values of the run-length coding encompass both the significant coefficients with the refinement coefficients. Thus, run-length decode module 82 performs a single run-length pass to decode all of the information, and does not perform separate passes on the significant and refinement coefficients. Refinement coefficients may have values restricted to −1, 0 and 1, which may be coded by two bits of information, as explained above.

The bitstream received by run-length decode module 82 may include run-length coded information, as well as one or more refinement coefficient rules. The run-length coded information includes sign information associated with the non-zero significant coefficients, but does not include sign information associated with at least some of the non-zero refinement coefficients. However, run-length decode module 82 can determine the sign information associated with at least some of the non-zero refinement coefficients based on the refinement coefficient rules and corresponding sign information associated with coefficients of a previous layer in the SVC scheme. In particular, frame/slice rules module 84 and block rules module 86 apply the respective rules to determine the missing sign information. Again, a first rule may apply with respect to a coded unit (e.g., a slice or frame) and a second rule may apply for a given video block within the coded unit.

When the second rule indicates that the first rule should be ignored, run-length decode module 82 determines sign information of the non-zero refinement coefficients of the given video block from the run-length coded information for the given video block. When the second rule indicates that the first rule should be applied, run-length decode module 82 determines the sign information of the non-zero refinement coefficients of the given video block associated with the second rule based on corresponding sign information associated with coefficients of the base or previous layer in the SVC scheme.

In both run-length coding unit 80 of FIG. 6 and run-length coding unit 70 of FIG. 5, refinement pass coefficients are coded together with significant coefficients, i.e., they are not skipped when computing or decoding run-lengths. The sign $s_n$ of the refinement coefficient in a fine granularity SNR scalability (FGS) layer n is highly correlated with the sign $s_{n-1}$ of the co-located coefficient in the base or previous layer, and therefore can be reconstructed based on the information received in the previous FGS layer. The probability of the sign being of the same or the opposite value depends on the quantization used, and more specifically, the value of a so-called "dead-zone parameter" used at the encoder.

Quantization of transform coefficients in an H.264/MPEG4-AVC CODEC or a SVC CODEC is typically based on uniform-reconstruction quantizers (URQ). The classification rule for quantizing the data may be determined by the encoder, but typically it involves a so-called dead-zone plus uniform threshold quantization (DZ-UTQ) approach. Equation 1 defines a dead-zone quantizer applying a DZ-UTQ approach, where $f_0$ denotes the dead-zone parameter with $0 \le f_0 \le 0.5$, and $\Delta$ denotes the step-size.

$$c_0 = \mathrm{sgn}(c) \cdot \left\lfloor \frac{|c|}{\Delta} + f_0 \right\rfloor \qquad (1)$$

In Equation 1, c denotes the original transform coefficient and $c_0$ is the corresponding level in the H.264/MPEG4-AVC or in SVC base layer. The corresponding level refers to the respective coefficient value in the base layer at the same location. Conceptually, the reconstruction value $r_0$ that corresponds to the level $c_0$ is derived by multiplying $c_0$ with the corresponding step-size $\Delta$:

$$r_0 = c_0 \cdot \Delta \qquad (2)$$

Equation 2 is a simplified version of what is actually specified for AVC and SVC. Scaling factors, which may also be included for normalization of the corresponding basis functions, are excluded for the sake of clarity.

Based on the DZ-UTQ strategy, Equation 3 defines the requantization of c in the n-th FGS layer, given the reconstructed coefficient $r_{n-1}$ of the (n−1)-th layer, which may be a previous enhancement layer or the base layer.

$$c_n = \mathrm{sgn}(c - r_{n-1}) \cdot \left\lfloor \frac{|c - r_{n-1}|}{\Delta \cdot 2^{-n}} + f_n \right\rfloor \text{ with } 0 < n \le 3 \qquad (3)$$

More specifically, Equation 3 implies that the reconstruction value $r_{n-1}$ of the preceding layer is subtracted from the original coefficient and that the resulting difference is quantized using one half of the step-size of the preceding layer. Note that for n>0, $c_n$ is clipped to the interval range of [−1, 1] in the event that $r_{n-1}$ is not equal to 0.

Figure 7:
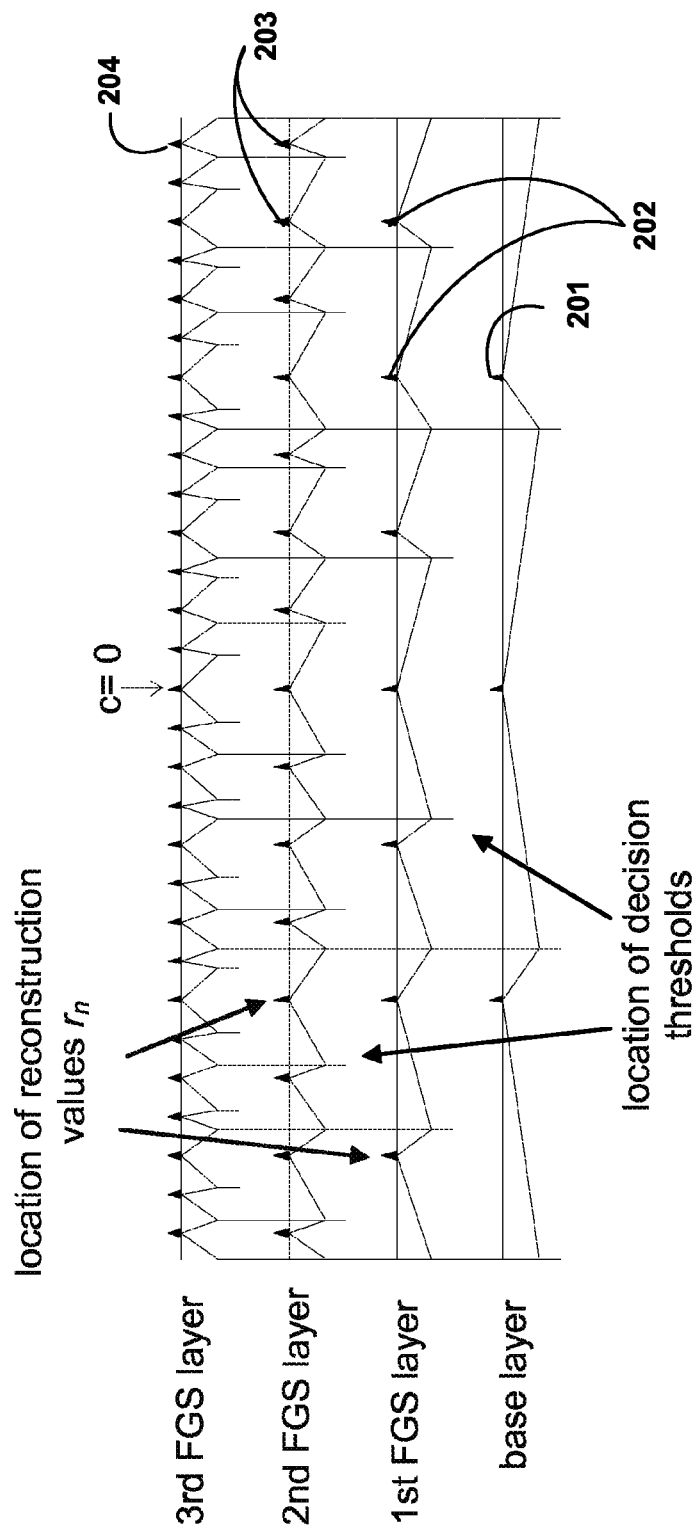
FIG. 7 is a graph showing an illustrative example consistent with this disclosure.

In FIG. 7, a graphical example is shown, where the dead-zone parameter $f_n$ is equal to ⅙, respectively, for all layers n≥0. The location of the reconstruction values for the different layers are shown as small solid triangles on the horizontal lines, where each such line indicates a different layer starting from the base layer at the bottom up to the third FGS layer on top of the graph. Also shown are the decision thresholds corresponding to the quantization rule of Equation 3 with a fixed choice of $f_n$. The graph of FIG. 7 illustrates that the probability of coeff_ref_dir_flag=0 is much higher than the probability of coeff_ref_dir_flag=1.

The dead-zone parameter, which decides the probability of coeff_ref_dir_flag being 0 or 1, is usually set in the encoder depending on the macroblock and frame type (I, P, or B frame), and is different for Inter and Intra macroblocks. Therefore, the probability is high that coeff_ref_dir_flag will differ between the neighboring macroblocks if they are of different types.

Hence, instead of sending the sign for each nonzero coefficient using one bit, as it is done for significant coefficients, when significant and refinement coefficients are coded together, the statistical relationship of refinement coefficient sign $s_n$ relative to sign $s_{n-1}$ can be used to further increase coding efficiency. Moreover, whether coeff_ref_dir_flag is 0 or 1 depends on the macroblock type. Thus, the macroblock type may be used to signal the sign value or selection of VLC tables.

In some cases, for each coded block, which may comprise a 4×4, 8×8, or 16×16 block, additional information is sent indicating that signs $s_n$ of all the refinement coefficients in this block can be inferred from signs $s_{n-1}$ of the corresponding coefficients of the previous layer. In particular, i.e., all signs $s_n$ have the same value as $s_{n-1}$ ($s_n=s_{n-1}$) or all signs $s_n$ have the opposite value of $s_{n-1}$ ($s_n=-s_{n-1}$). The probability of these two cases depends on the type of macroblock and, therefore, at the beginning of the coded unit (e.g., a slice or a frame), rule information can be sent to identify which case should be used for Intra macroblocks and which case is being used for Inter macroblocks.

Alternatively, instead of assigning a codeword only to a run-length value for a VLC table, VLC codewords can be assigned to pairs (run, coeff_ref_dir_flag). Since coeff_ref_dir_flag depends on macroblock type, the VLC table can be made to depend on the cycle number and macroblock type. The cycle number refers to a location in a zig-zag scan that is coded into run-length cycles. Each run length cycle may define a run value, a level value and a sign value.

These alternatives may also be combined with a solution in which the encoder device sends information to the decoder device to identify blocks having refinement coefficients that are all zero. In this case, if all refinement coefficients are equal to 0 in the current layer, they may be skipped when computing run-lengths, and the decoder may derive the information under the assumption that these values were skipped when computing the run-lengths based on the transmitted information that identifies such blocks as having refinement coefficients that are all zero.

Figure 8:
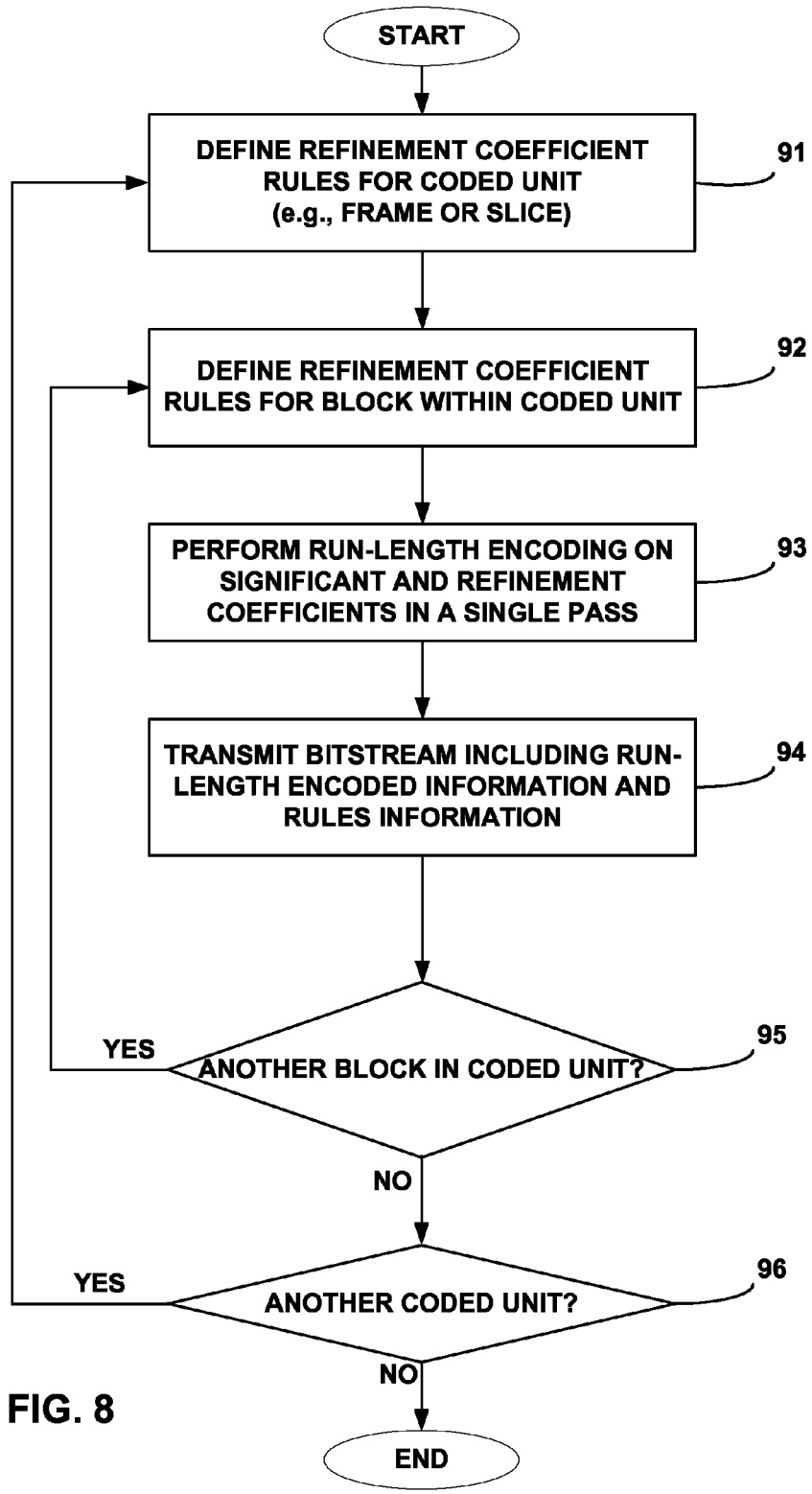
FIG. 8 is a flow diagram illustrating a run-length encoding technique consistent with this disclosure.

FIG. 8 is a flow diagram illustrating an encoding technique for run-length coding coefficients of an enhancement layer consistent with this disclosure. As shown in FIG. 8, module 74 of run-length coding unit 70 defines refinement coefficient rules for a coded unit, such as a frame or a slice of a frame (91). As an example, the refinement coefficient rules for the coded unit may specify for different block types (e.g., intra or inter blocks) whether the sign should be the same or inverted relative to the signs of corresponding coefficients of the previous layer. Module 76 then defines refinement coefficient rules for a video block within the coded unit coded unit (92). As an example, the refinement coefficient rules for a given video block may specify whether the rules for the coded unit should be followed or ignored.

Based on these rules, run-length encode module 72 performs run-length encoding on the refinement coefficients and significant coefficients of a video block in a single pass (93). Run-length encode module 72 may access VLC tables 88 to facilitate this encoding. Run-length encode module 72 may identify the different types of coefficients based on the content of the previous layer, but may treat the different coefficients the same for purposes of determining run values from VLC tables 88. In the encoding process, the sign values for significant coefficients may be included within run-length coded information. The sign values for refinement coefficients, however, may be excluded in some cases where such information can be derived at the decoder based on the rules information. For example, if the second rule indicates that the first rule should be applied, the sign information for refinement coefficients may be excluded form the run-length encoded information to improve compression efficiency in the coding of a given video block.

Run-length coding unit 72 outputs the encoded bitstream for transmission to another device (94), e.g., via a modulator/transmitter 24 shown in FIG. 1. The transmitted bitstream may include both the run-length encoded information and the rules information. For each block of a coded unit (95), refinement coefficient rules for that block may be defined. For each coded unit (96), the refinement coefficient rules for that coded unit may be defined. In this manner, the rules can adapt to content on both a block basis and a coded unit basis.

As noted above, an alternative to sending the rules information may involve the use of more complex VLC tables, e.g., having multiple input index values on the encoder side and multiple outputs per codeword on the decoder side. In this case, the run-length coding performed by module 72 may include table lookups into VLC tables 78 based on pairs of values, wherein the pairs include the run values and second values that depend on a type associated with a video block being coded. This way, the different rules for coded blocks may be included as part of the table lookups. In other words, the information conveyed by the rules (per the technique of FIG. 8) may be embedded into the VLC tables, and the table lookups can be based on the run values and second values that depend on a type associated with a video block being coded. This alternative technique may also eliminate the need to send sign information, essentially embedding at least some of the derivable sign-based information into the table lookups. This table-based implementation would require more codewords in the tables, however, and could be less efficient than using the less complex tables and sending the rules information to the decoder for each coded unit and each block.

Figure 9:
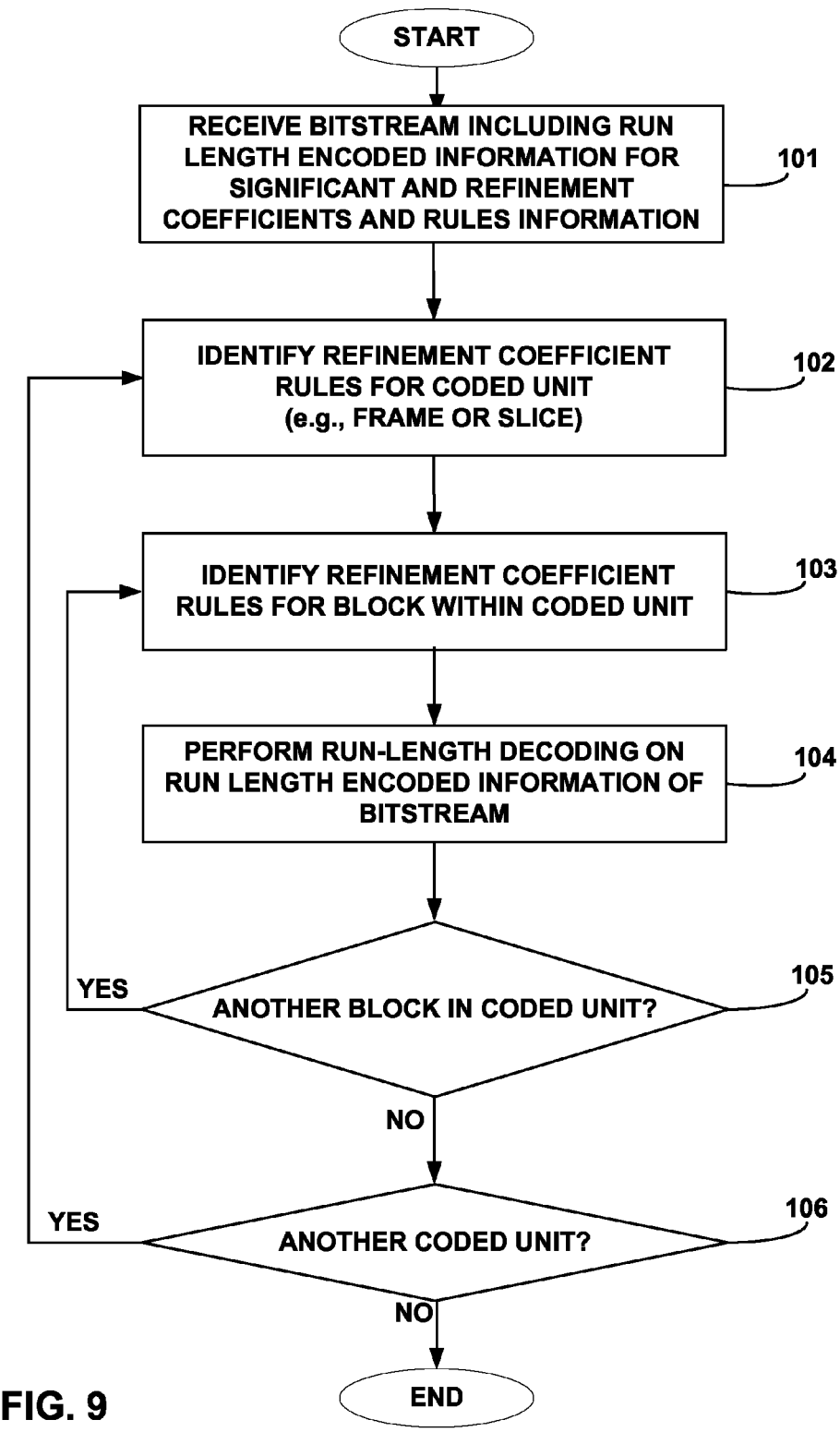
FIG. 9 is a flow diagram illustrating a run-length decoding technique consistent with this disclosure.

FIG. 9 is a flow diagram illustrating a decoding technique for run-length coding coefficients of an enhancement layer consistent with this disclosure. As shown in FIG. 9, run-length decode module 82 receives a bitstream including run-length encoded information for significant and refinement coefficients and rules information (101). Module 84 identifies refinement coefficient rules for a coded unit, e.g., a frame or a slice, based on the rules information received in the bitstream (102). Similarly, module 86 identifies refinement coefficient rules for a given video block within the coded unit (103).

Based on these rules, run-length decode module 82 performs run-length decoding on the refinement coefficients and significant coefficients in a single pass (104). In doing so, run-length decode module 82 may determine the sign information associated with at least some of the refinement coefficients based on the refinement coefficient rules and corresponding sign information associated with coefficients of a previous layer in the SVC scheme, which may be stored in a memory that is accessible to run-length decode module 82, such as a memory associated with VLC tables 88.

Run-length decode module 82 may identify the different types of coefficients based on the content of the previous layer, but may treat the different coefficients the same for purposes of decoding run values. Run values may be generated based on lookups of codewords into VLC tables 88. Sign values for significant coefficients may be decoded from the bitstream. The sign values of refinement coefficients, however, may have been excluded from the bitstream. For such excluded sign values, run-length decode module 82 derives the sign values based on the rules and corresponding sign information of corresponding coefficients of previous SVC layers.

In particular, when a second rule (block based rule) indicates that the first rule (coded unit rule) should be ignored, run-length decode module 82 determines sign information of the refinement coefficients of the given video block from the run-length coded information. However, when the second rule indicates that the first rule should be applied, run-length decode module 82 determines the sign information of the refinement coefficients of the given video block based on the corresponding sign information associated with coefficients of the previous layer in the SVC scheme.

For each block of a coded unit (105), refinement coefficient rules for that block are identified in the bitstream. Also, for each coded unit (106), the refinement coefficient rules for that coded unit may be defined. In this manner, the rules can be identified on both a block basis and a coded unit basis, and then used to perform the run-length decoding that occurs with respect to both the significant and refinement coefficients that are coded together (104).

A decoding alternative to receiving and applying the rules information may involve the use of more complex VLC tables. Again, in this case, the run-length coding performed by module 72 may include table lookups into VLC tables 78 based on pairs of values, wherein the pairs include the run values and second values that depend on a type associated with a video block being coded. On the decoding side, reciprocal VLC tables 88 may be included in run-length coding unit 80 so that a transmitted code word can be mapped back to the run values and the second values that depend on a type associated with a video block being coded. Again, this alternative technique may also eliminate the need to send sign information, essentially embedding derivable sign-based information into the code words that are decodable by VLC tables 88.

Referring again to FIG. 1, in addition to the techniques described above, in some cases, video encoder 22 may use additional information to signal to video decoder 28 whether the sign values of the refinement coefficients are encoded in the run-length information, or whether the sign values of the refinement coefficients are excluded from the run-length information and need to be derived at video decoder 28. This additional information is referred to herein as "code_sign information." Run-length encode module 72 of run-length coding unit 70 (FIG. 5) may determine whether to code and send such code_sign information, and run-length decode module 82 of run-length coding unit 80 (FIG. 6) may interpret any received code_sign information. In this way, encoder 22 and decoder 28 can communicate information that indicates whether sign information for refinement coefficients is included in or excluded from the coded run-length information.

For example, when code_sign=1, the sign of each nonzero refinement coefficient may need to be sent to decoder 28. Alternatively, when code_sign=0, no sign information may need to be sent for the nonzero refinement coefficients, since such information can be derived at decoder 28. At the beginning of a coded unit (e.g., a frame or a slice), information can be sent to indicate the types of video blocks (Inter and/or Intra) that may include code_sign information, and which rules should be used for Intra video blocks and Inter video blocks. Alternatively encoder 22 and decoder 28 may have an agreement of the types of video blocks that may include code_sign information, and an agreement of the rules that should be used, e.g., depending on the coded unit (e.g., frame or slice) video block type, and number of the FGS layer. Two additional techniques are discussed below, each of which may further reduce the bitrate associated with transmission of coded video by limiting the number of video blocks for which code_sign is transmitted.

In one example, code_sign information is only transmitted for video blocks in which the number of refinement coefficients is larger than X, where X is an integer greater than 0. As an example, X may be equal to 5. For video blocks that have X or less refinement coefficients, code_sign information may not be coded or transmitted in the bitstream. Such video blocks may have non-zero refinement coefficients for which the sign information will have to be sent. However, since the probability of any refinement coefficient being 0 is usually within the range of 85-95%, for the majority of these blocks (e.g., in which X is not greater than 5) all the refinement coefficients will most likely be equal to 0.

In this case, video encoder 22 (e.g., run-length coding unit 70 (FIG. 5) of an enhancement layer encoder 34) may generate run-length coded information for a video block based on the significant coefficients and the refinement coefficients, wherein the run-length coded information includes the run values and sign information associated with the significant coefficients. Video encoder 22 may then determine whether a number of refinement coefficients in the video block is greater than X, wherein X is an integer. Video encoder 22 may include sign information associated with the refinement coefficients in the run-length coded information when the number of refinement coefficients is not greater than X. When the number of refinement coefficients is greater than X, video encoder 22 may define one or more refinement coefficient rules to facilitate determinations of sign information associated with at least some of the refinement coefficients, and exclude the sign information associated with at least some of the refinement coefficients from run-length coded information.

Another possibility is to code, and send code_sign information and any additional sign information that is needed, only after coding and sending all the refinement coefficients within a given video block. In this case, code_sign information may be coded and sent only for the video blocks that actually have non-zero refinement coefficients. In this case, code_sign information is not coded and sent if there are no non-zero refinement coefficients.

In this case, video encoder 22 (e.g., run-length coding unit 70 (FIG. 5) of an enhancement layer encoder 34) may generate run-length coded information for a video block based on the significant coefficients and the refinement coefficients, wherein the run-length coded information includes the run values and sign information associated with the significant coefficients, and determine whether any of the refinement coefficients have non-zero values. When one or more of the refinement coefficients have non-zero values, video encoder 22 may define one or more refinement coefficient rules to facilitate determinations of sign information associated with the refinement coefficients that have non-zero values, and exclude the sign information associated with at least some of the refinement coefficients that have non-zero values from run-length coded information.

On the decoder side, video decoder 28 (e.g., run-length coding unit 80 (FIG. 6) of a base/enhancement layer decoder 40) may perform decoding techniques that use any received code_sign information. For example, video decoder 28 may receive run-length coded information for the video block based on the significant coefficients and the refinement coefficients, wherein the run-length coded information includes the run values and sign information associated with the significant coefficients. In addition, video decoder 28 may receive code_sign information indicating that video decoder 28 should apply one or more refinement coefficient rules to determine sign information associated with at least some of the refinement coefficients. In this case, video decoder 28 may generate the sign information associated with at least some of the refinement coefficients based on the rules.

In addition to the techniques described above, additional techniques may also be used to further reduce the bitrate associated with transmission of video information. In particular, information indicative of some of the refinement coefficient values may be excluded from the bitstream that is transmitted from source device 12 to receive device 16. The values for such excluded refinement coefficients can be derived at video decoder 28 based on a history associated with corresponding transform coefficients. In particular, for a given type of video block, the values of some of the refinement coefficients can be determined to be zero, based on the history associated with the corresponding transform coefficients. In this case, information indicative of the values for these refinement coefficients may be excluded from the bitstream since the values can be derived at the decoder. Refinement coefficients that can be determined to be zero based on the history may be referred to as type-0 coefficients, while other refinement coefficients may be referred to as type-1 coefficients.

Referring again to FIG. 7, some refinement coefficient values can assume values of −1, 0 and 1, while other refinement coefficient values can only assume a subset of these values. Some refinement coefficient values can only be zero given the past history. For example, if the base layer had a refinement coefficient value of 1 (as shown at 201), then given the history of values shown in FIG. 7, the only possible values for the corresponding refinement coefficient in the $1^{st}$ FGS layer is 0 and 1 (as shown at 202). Also, if the base layer had a refinement coefficient value of 1 (as shown at 201) and the $1^{st}$ FGS layer had a refinement coefficient value of 1 (the rightmost triangle at 202), then the only possible values for the corresponding refinement coefficient in the $2^{nd}$ FGS layer is 0 and 1 (as shown at 203). Given that history, the corresponding refinement coefficient value for the $3^{rd}$ FGS layer may have a value of 0 (as shown at 204). In this case, given the history refinement coefficient values (base layer=1, $1^{st}$ FGS layer=1, and $2^{nd}$ FGS=1), it is known that the $3^{rd}$ FGS layer must have a refinement coefficient equal to zero. In this way, a history of refinement coefficient values may be exploited (in conjunction with the techniques described above) and thereby eliminate the need to send some refinement coefficient information for coefficient values that can be derived based on the history of corresponding coefficients in previous layers.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC).

If implemented in hardware, this disclosure may be directed to a circuit, such as an integrated circuit, chipset application specific integrated circuit (ASIC), field programmable gate array (FPGA), logic, or various combinations thereof configured to perform one or more of the techniques described herein.

Various embodiments of the invention have been described. These and other embodiments are within the scope of the following claims.

The invention claimed is:

1. A method of coding an enhancement layer in a scalable video coding (SVC) scheme comprising run-length coding significant coefficients and refinement coefficients of the enhancement layer together such that run values of the run-length coding code the significant coefficients with the refinement coefficients, wherein the refinement coefficients are coefficients of the enhancement layer for which corresponding coefficients of a previous layer in the SVC scheme had non-zero values and wherein the significant coefficients are coefficients of the enhancement layer for which the corresponding coefficients of the previous layer in the SVC scheme had values of zero.

2. The method of claim 1, wherein coding comprises encoding, the method further comprising:
   generating run-length coded information based on the significant coefficients and the refinement coefficients, wherein the run-length coded information includes the run values and sign information associated with the significant coefficients;
   defining one or more refinement coefficient rules to facilitate determinations of sign information associated with at least some of the refinement coefficients;
   excluding the sign information associated with at least some of the refinement coefficients from the run-length coded information based on the rules; and
   including the sign information associated with at least some of the refinement coefficients from the run-length coded information based on the rules.

3. The method of claim 2, wherein the refinement coefficient rules include a first rule for a coded unit and a second rule for a given video block within the coded unit.

4. The method of claim 3, wherein the coded unit comprises either a video frame or a slice of a video frame.

5. The method of claim 3, wherein the first rule indicates for each of two or more types of video blocks whether signs associated with the refinement coefficients should be kept the same or changed relative to signs of corresponding coefficients of a previous layer in the SVC scheme, and the second rule indicates whether the first rule should be applied or ignored for the given video block.

6. The method of claim 5, the method further comprising:
when the second rule indicates that the first rule should be ignored, including the sign information associated with the refinement coefficients in the run-length coded information for the given video block; and
when the second rule indicates that the first rule should be applied, not including the sign information of the refinement coefficients in the run-length coded information for the given video block.

7. The method of claim 5, wherein the two or more types of video blocks include intra coded video blocks and inter coded video blocks.

8. The method of claim 2, further comprising:
transmitting the run-length coded information and information that defines the refinement coefficient rules.

9. The method of claim 1, wherein run-length coding includes performing table lookups based on the run values to generate variable length codes.

10. The method of claim 1, wherein run-length coding includes performing table lookups based on pairs of values to generate variable length codes, the pairs including the run values and second values that depend on a type associated with a video block being coded.

11. The method of claim 1, wherein coding comprises decoding, the method further comprising:
receiving run-length coded information that includes sign information associated with the significant coefficients but does not include sign information associated with at least some of the refinement coefficients;
receiving one or more refinement coefficient rules; and
determining the sign information associated with at least some of the refinement coefficients based on the refinement coefficient rules and corresponding sign information associated with coefficients of a previous layer in the SVC scheme.

12. The method of claim 11, wherein the refinement coefficient rules include a first rule for a coded unit and a second rule for a given video block within the coded unit.

13. The method of claim 12, wherein the first rule indicates for each of two or more types of video blocks whether signs associated with the refinement coefficients should be kept the same or changed relative to signs of corresponding coefficients of a previous layer in the SVC scheme, and the second rule indicates whether the first rule should be applied or ignored for the given video block.

14. The method of claim 13, the method further comprising:
when the second rule indicates that the first rule should be ignored, determining the sign information associated with the refinement coefficients of the given video block based on the run-length coded information for the given video block; and
when the second rule indicates that the first rule should be applied, determining the sign information of the refinement coefficients of the given video block based on the corresponding sign information associated with coefficients of the previous layer in the SVC scheme.

15. The method of claim 1, wherein coding comprises encoding a video block, the method further comprising:
generating run-length coded information for the video block based on the significant coefficients and the refinement coefficients, wherein the run-length coded information includes the run values and sign information associated with the significant coefficients;
determining whether a number of refinement coefficients in the video block is greater than X, wherein X is a positive integer;
including sign information associated with the refinement coefficients in the run-length coded information when the number of refinement coefficients is not greater than X; and
when the number of refinement coefficients is greater than X:
defining one or more refinement coefficient rules to facilitate determinations of sign information associated with at least some of the refinement coefficients; and
excluding the sign information associated with at least some of the refinement coefficients from the run-length coded information.

16. The method of claim 1, wherein coding comprises encoding a video block, the method further comprising:
generating run-length coded information for the video block based on the significant coefficients and the refinement coefficients, wherein the run-length coded information includes the run values and sign information associated with the significant coefficients;
determining whether any of the refinement coefficients have non-zero values; and
when one or more of the refinement coefficients have non-zero values:
defining one or more refinement coefficient rules to facilitate determinations of sign information associated with the refinement coefficients that have non-zero values; and
excluding the sign information associated with at least some of the refinement coefficients that have non-zero values from the run-length coded information.

17. The method of claim 1, wherein coding comprises decoding a video block, the method further comprising:
receiving run-length coded information for the video block based on the significant coefficients and the refinement coefficients, wherein the run-length coded information includes the run values and sign information associated with the significant coefficients;
receiving information indicating that the decoder should apply one or more refinement coefficient rules to determine sign information associated with at least some of the refinement coefficients; and
generating the sign information associated with at least some of the refinement coefficients based on the rules.

18. A device comprising a run-length coding unit configured to code an enhancement layer in a scalable video coding (SVC) scheme, wherein the run-length coding unit run-length codes significant coefficients and refinement coefficients of the enhancement layer together such that run values of the run-length coding code the significant coefficients with the refinement coefficients, wherein the refinement coefficients are coefficients of the enhancement layer for which corresponding coefficients of a previous layer in the SVC scheme had non-zero values and wherein the significant coefficients are coefficients of the enhancement layer for which the corresponding coefficients of the previous layer in the SVC scheme had values of zero.

19. The device of claim 18, wherein the run-length coding unit encodes the enhancement layer, wherein the run-length coding unit:
generates run-length coded information based on the significant coefficients and the refinement coefficients, wherein the run-length coded information includes the run values and sign information associated with the significant coefficients;
defines one or more refinement coefficient rules to facilitate determinations of sign information associated with at least some of the refinement coefficients;

excludes the sign information associated with at least some of the refinement coefficients from the run-length coded information based on the rules; and includes the sign information associated with at least some of the refinement coefficients from the run-length coded information based on the rules.

20. The device of claim 19, wherein the refinement coefficient rules include a first rule for a coded unit and a second rule for a given video block within the coded unit.

21. The device of claim 20, wherein the coded unit comprises either a video frame or a slice of a video frame.

22. The device of claim 20, wherein the first rule indicates for each of two or more types of video blocks whether signs associated with the refinement coefficients should be kept the same or changed relative to signs of corresponding coefficients of a previous layer in the SVC scheme, and the second rule indicates whether the first rule should be applied or ignored for the given video block.

23. The device of claim 18, wherein the device comprises at least one of:

a circuit; and a wireless communication device.

24. A non-transitory computer-readable medium comprising instructions that upon execution in a video coding device cause the device to code an enhancement layer in a scalable video coding (SVC) scheme, wherein the instructions cause the device to run-length code significant coefficients and refinement coefficients of the enhancement layer together such that run values of the run-length coding code the significant coefficients with the refinement coefficients, wherein the refinement coefficients are coefficients of the enhancement layer for which corresponding coefficients of a previous layer in the SVC scheme had non-zero values and wherein the significant coefficients are coefficients of the enhancement layer for which the corresponding coefficients of the previous layer in the SVC scheme had values of zero.

25. A device comprising:

means for coding an enhancement layer in a scalable video coding (SVC) scheme, wherein the means for coding performs run-length coding on significant coefficients and refinement coefficients of the enhancement layer together such that run values of the run-length coding code the significant coefficients with the refinement coefficients; and means for communicating run-length coded information including the run values, wherein the refinement coefficients are coefficients of the enhancement layer for which corresponding coefficients of a previous layer in the SVC scheme had non-zero values and wherein the significant coefficients are coefficients of the enhancement layer for which the corresponding coefficients of the previous layer in the SVC scheme had values of zero.

* * * * *